March 10, 1959
A. HUWYLER
2,877,400
SPEED REGULATOR FOR MONOPHASE AND POLYPHASE
ALTERNATING-CURRENT MOTORS
Filed June 28, 1954
2 Sheets-Sheet 1
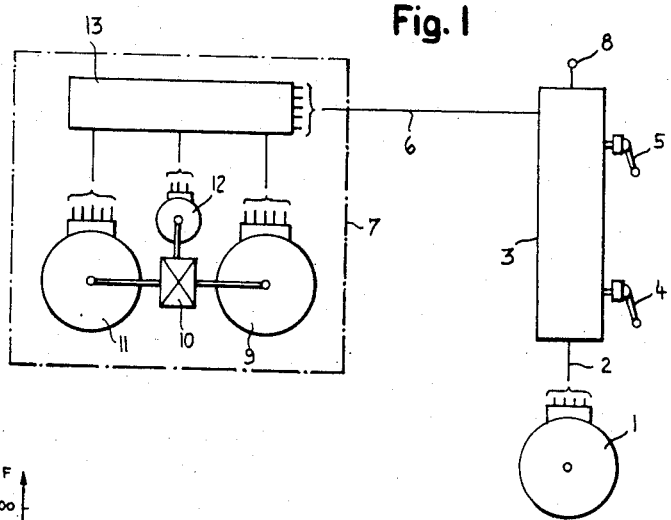
Fig. 1
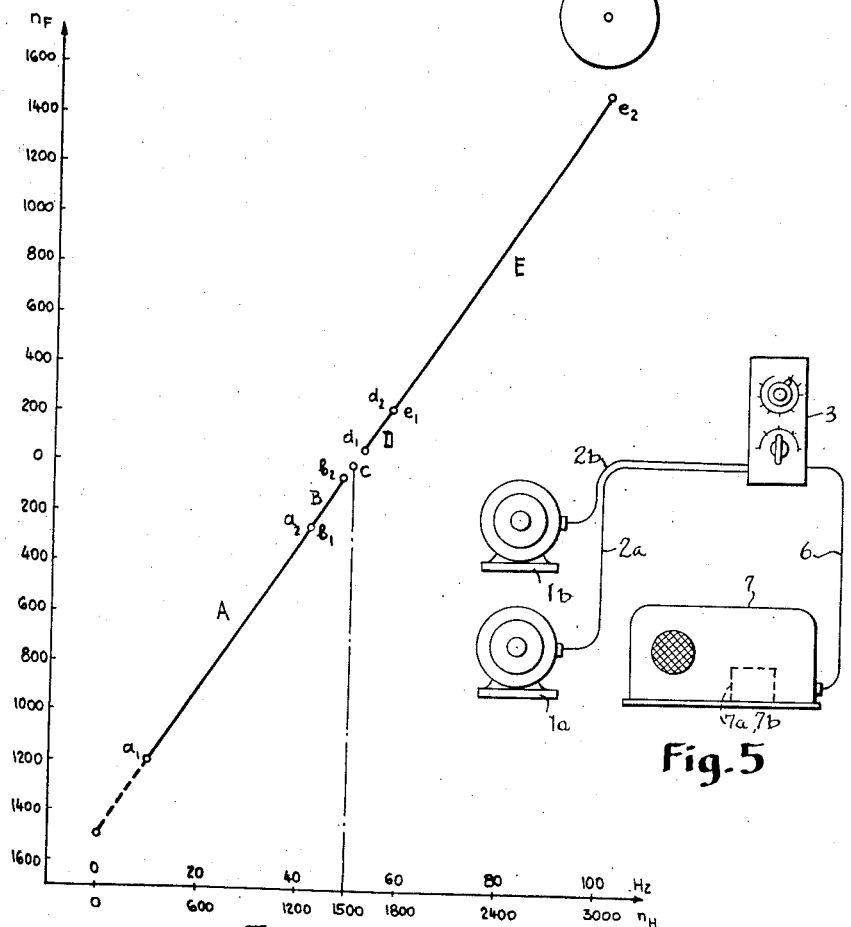
Fig. 2
Fig. 5
INVENTOR:
Alois Huwyler

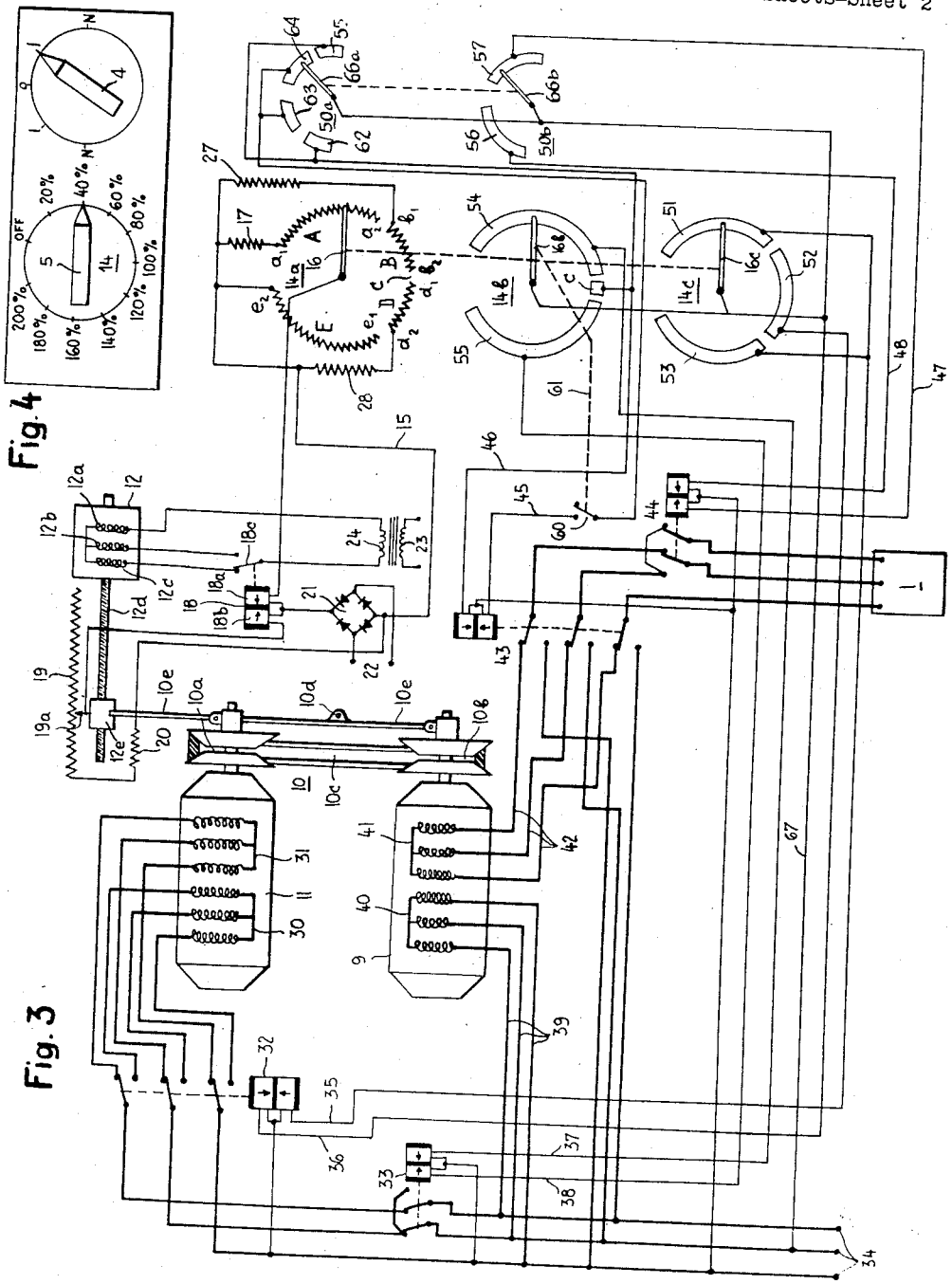

United States Patent Office 2,877,400
Patented Mar. 10, 1959

2,877,400

SPEED REGULATOR FOR MONOPHASE AND POLYPHASE ALTERNATING-CURRENT MOTORS

Alois Huwyler, Zurich, Switzerland

Application June 28, 1954, Serial No. 439,793

Claims priority, application Switzerland May 26, 1954

13 Claims. (Cl. 318—231)

The present invention relates to a speed regulator for monophase and polyphase alternating-current motors in which a primary asynchronous frequency converter supplies the principal motor to be regulated and is in turn driven by a change-pole A. C. motor.

Such regulators are already known and frequently used in practice owing to the fact that the speed of the principal motor is largely determined by the speed of the converter only, which may be altered with little loss by pole-changing its driving motor. The known devices of the kind, however, display the disadvantage that they enable the speed of the principal motor to be altered only by steps corresponding to the pole-changing of the driving motor.

The present invention is designed to eliminate this disadvantage and relates to a speed regulator for monophase and polyphase A. C. motors comprising an asynchronous frequency converter driven by a pole-changing asynchronous motor through an infinitely variable gear. The invention is characterized by the fact that the gear is rendered infinitely variable by an electrical adjuster via an electrical remote control unit having a switch positively coupled to the pole-changing control of the converter driving motor in such a manner that on actuation of the switch the frequency of the supply voltage for the driven motor is continuously adjustable, at least in fractional ranges, from a minimum value corresponding to the maximum gear ratio and highest converter speed in the one direction to a maximum value corresponding to the maximum ratio and highest converter speed in the opposite direction.

An embodiment of the present invention is described in greater detail in conjunction with Figs. 1–5, wherein:

Fig. 1 is a basic circuit diagram of an embodiment of the speed regulator;

Fig. 2 is a speed graph for a device operating on the principle according to Fig. 1;

Fig. 3 is an electrical circuit diagram for an embodiment of certain essential parts of the remote control unit;

Fig. 4 is a diagrammatic front view of the remote control unit according to Fig. 3;

Fig. 5 is a block diagram of the complete installation.

Referring now to the basic circuit diagram according to Fig. 1, the principal motor to be operated at infinitely variable speed, such as a three-phase squirrel-cage induction motor, is designated at 1 and connected to the remote control unit 3 by means of line 2. The remote control unit 3 is provided with the operating levers 4 and 5 and connected to the converter group 7 by means of lines 6. According to the position of the lever 4 the principal motor can be supplied either from the mains 8 at constant frequency or from the converter group 7 at optional frequency by means of phase commutation in either desired direction of rotation.

In the converter group 7 there is provided an asynchronous frequency converter 9 which may be fed from 50 C./S. three-phase mains 8. The rotor of the frequency converter 9 is driven with variable speed in either direction of rotation by the pole-changing asynchronous motor 11 via an infinitely variable transmission 10. According to whether the direction of rotation of the rotor of the frequency converter 9 is the same or the opposite of the magnetic rotating field created by three-phase excitation, the three-phase current in the output circuit of the frequency converter 9 possesses a lower or higher frequency than the three-phase exciting current.

The gear 10, by way of example, permits the speed ratio of the axis of the motor 11 to be infinitely varied from 1:1.6 to 1:0.25 and may be of any suitable design such as an adjustable pulley, friction wheel, or hydraulic gear.

The speed adjustment is effected through an adjustable motor 12 in turn actuated by the handle 5 of the tele-transmitter 3.

The converter group 7 contains an assembly 13 with relay and contactors controlled by the same operating lever 5 in such a manner that the latter causes poles of the motor 11 to be changed at predetermined points between its two extreme positions, so that the said motor 11 is shifted to another speed level. Between these two pole-changing points the lever continuously alters the gear 10 between predetermined initial and final values of its transmission ratio. Fig. 2 shows a speed diagram the abscissa of which indicates the three-phase frequency supplied by the converter and the resulting speed $n_H$ of the principal motor 1 respectively, depending on the speed $n_F$ of the converter rotor. This diagram is dimensioned for an embodiment of the complete installation in which the gear 10 is employed within a transmission range of 1:1.5 to 1:0.25 and wherein the asynchronous motor 11 excited by three-phase current of 50 C./S. can be switched between 6 and 24 poles, i. e. within a nominal speed of $n_1=1000$ R. P. M. and $n_2=250$ R. P. M. When the lever 5 is turned from its inoperative position into final position, the speed graph is traversed from point $a_1$ to point $a_2$, the following final positions succeeding one another automatically:

$a_1$=motor speed $n_1$, ratio 1:1.2;

$a_1 \ldots a_2$=motor speed $n_1$, ratio continuously changing from 1:1.2 to 1:0.25;

$b_1$=motor speed $n_2$; ratio 1:1;

$b_1 \ldots b_2$=motor speed $n_2$, ratio changes continuously from 1:1 to 1:0.25;

$c$=motor 11 switched off, principal motor 1 supplied direct by 50 C./S. mains;

$d_1$=motor in reverse at speed $n_2$, ratio 1:0.25;

$d_1 \ldots d_2$=motor running in reverse at speed $n_2$, reduction ratio changes continuously from 1:0.25 to 1:1;

$e_1$=motor in reverse at speed $n_1$, ratio 1:0.25;

$e_1 \ldots e_2$=motor in reverse at speed $n_1$, reduction ratio changes continuously from 1:0.25 to 1:1.5.

The values entered in the diagram are the nominal speeds, which change somewhat when slip is allowed for.

As seen in Fig. 2, a discontinuity of the order of ±2.0 C. S. is found in the neighbourhood of point $c$ because the gear transmission ratio is here limited to a maximum of 1:0.25. This discontinuity is, however, immaterial in practical operation. The means controlling the relay assembly 13 and the adjusting motor 12 effecting the above settings are described in detail below.

Naturally, the speed regulator according to the principle disclosed in Fig. 1 is by no means limited to the embodiment shown with a pole-changing driving motor 11, which is adjustable between the two rated speeds $n_1$ and $n_2$, for the frequency converter 9, and other speed ranges could be provided for the gear 10. If desired, a motor with more than two fixed rated speeds may be used as well.

Fig. 3 illustrates by way of example a circuit diagram common to the converter group 7 and the remote control unit 3. The asynchronous motor 11 is designed as pole changeable motor as mentioned above. In the diagram this has been indicated by the arrangement of two sets of coils 30 and 31. The said sets of coils 30 and 31 are through relay switches 32 and 33 connected with contacts 34 which are the terminals of a three-phase network. The relay switch 32 changes the poles and coils 30 and 31 of the asynchronous motor 11 so that depending on the position of said relay switch, either the coil 30 or the coil 31 is energized so that the motor rotates at the speed $n_1$ or $n_2$ respectively. The relay switch 32 is so designed that it connects the coil 30 or 31 respectively with the network 34 only when one of the two exciting coils of the relay switch 32 is energized. Two phases of the three-phase voltage derived from the contacts 32 may be changed by the relay switch 33 so that a change in the direction of rotation of the motor 11 will be brought about by actuation of this switch. The switch relays 32 and 33 are on one hand connected with one line of the supplied three-phase voltage and on the other hand are connected through conductors 35, 36, 37 and 38 with the switch 14 adapted to be actuated by the operating lever 5.

The supplied three-phase voltage is furthermore connected through conductor 39 with the stator coil 40 of the asynchronous frequency converter 9 so that in the stator of this converter an electric rotating field is formed with the frequency of the supplied three-phase voltage for instance 50 cycles. The rotor coil 41 of the frequency converter 9 is connected through conductors 42 to switch relay 43 and switch relay 44 with the motor 1 to be driven or with another current consumer. The relay switch 43 may selectively connect the current consumer 1 with the three-phase voltage 34 or with the frequency converter coil 41.

The switch relay 44 is so arranged that the three-phase voltage as derived from the switch relay 43 is changed, i. e. when switching this relay switch, the motor 1 connected thereto will rotate in a direction opposite to its previous rotation. Both switch relays 43 and 44 are connected through lines 45 and 46 and 47 and 48 respectively with the switches 50a and 50b arranged on the same axis, said switches being operable by the lever 4. Arranged between the pole changing driving motor 11 and the frequency converter 9 is an infinitely variable transmission 10 the transmission ratio of which is adjustable by means of a motor 12 shown diagrammatically in the circuit. The transmission 10 may consist of a wedge-friction wheel 10a and 10b which are connected to each other by means of a belt pulley 10c. Each of the wheels 10a and 10b is composed of two halves while the distance between said two halves is adjustable by the motor 12 so that the transmission ratio between the two wheels 10a and 10b may be varied. Transmissions of this type are generally known so that a further detailed description is not necessary. A link system 10e is on one hand connected with one half of each wedge-friction wheel and on the other hand is tiltable about a point 10d located between two wheels. Connected to the rotor of the motor 12 is a threaded spindle 12d which carries a follower 12e pivotally connected with the lever 10e. When the follower 12e is displaced in view of a rotation of the shaft 12d, for instance toward the right with regard to the drawing, the speed of the frequency converter 9 increases, whereas when the follower 12e is displaced toward the left, the speed of the frequency converter 9 decreases. Connected with the follower 12e but insulated therefrom is a sliding contact 19a, adapted to slide over a variable resistance 19. The arrangement is such that the effective resistance between the sliding contact 19a and terminal of the resistance 19 changes automatically with a change in the transmission ratio.

The regulator 14a for the adjustable motor 12 actuated by lever 5 comprises a potentiometer having four separate resistance sectors A, B, D and E arranged along its periphery, the ends of which are designated at $a_1$ and $a_2$ and $b_1$ and $b_2$, $d_1$ and $d_2$ and $e_1$ and $e_2$ respectively, the ends $a_1$, $b_1$, $d_2$ and $e_2$ being connected to line 15 through the intervention of variable resistances 17, 27 and 28 respectively. If the rotary arm 16 of the control 14 is turned in a clockwise direction from the inoperative position (shown in Fig. 3) the resistance effective between the arm 16 and the line 15 in the position $a_1$ is identical with the resistance 17, it continuously increases up to position $a_2$, returns to substantially zero at $b_1$, increases again to $b_2$. In the position $c$ the circuit is broken. The control resistance in position $d_1$ is identical with that at $b_2$, decreases to the balancing resistance 28 at position $d_2$, is identical with that of $a_2$ at $e_1$ and continuously decreases to zero until $e_2$.

The resistance effective between the arm 16 and the line 15 of the control 14 forms the one branch of a bridge circuit together with the winding 18a of a differential relay 18, while the winding 18b, the variable resistance 19 and the series-connected balancing resistance 20 form the other arm of the said bridge. The two parallel bridge branches are supplied with D. C. voltage by a rectifier 21 via its terminals 22, e. g., from a tap of motor 11. The differential relay 18 is provided with a contact arm 18c whose idle position is in the centre which is connected to the secondary terminals of a transformer 24 of which the primary terminals 23 are connected to an A. C. voltage source. According to whether the contact arm 18c establishes contact on the one side or the other, the A. C. voltage of the transformer 24 is connected to the windings 12a, 12b and 12a, 12c respectively of the adjustable motor 12 and the latter operated in one direction of rotation or the other. As mentioned above, the adjusting motor 12 effects an adjustment of the gear 10. Together with the adjustment of the gear 10, there is also adjusted the variable resistance 19 of the bridge circuit so that the motor 12 will run until the differential relay is de-energized.

The regulator 14, the bridge circuit with the differential relay 18 and the variable resistance 19, and the adjustable motor 12 constitute a control circuit with a so-called "rigid return." Each adjustment of the regulator 14 between the positions $a_1$ and $a_2$ causes a corresponding adjustment of the gear 10. The resistance 19 is so designed that the resistance value is approximately zero with a transmission ratio of approximately 1:1.5 of the gear 10. In the position $a_1$ of the regulator 18 the bridge circuit is in equilibrium and the adjustable motor 12 de-energized, the resistance value of 19 and 20 being identical with the resistance value 17 corresponding to a ratio of 1:1.2. When the regulator 14 is shifted from $a_1$ to $a_2$ the bridge is balanced at another position of the resistance 19 so that the gear 10 is adjusted until a ratio of approx. 1:0.25 is achieved in position $a_2$. When the regulator 14 is shifted into position $b_1$, the bridge, in accordance with the resistance 27 is balanced only at a value of the resistance 19 corresponding to a ratio 1:1 of gear 10. When the regulator 14 is shifted from $b_1$ to $b_2$, the gear is again continuously altered to a ratio of 1:0.25 in position $b_2$.

In the position $c$ of the regulator 14, the bridge circuit is broken. In position $d_1$, the motor 11 is started in reverse for reasons which will be explained later, and the regulator resistance is designed to produce the ratio of 1:0.25 as in position $b_2$. Shifting the regulator to $d_2$ causes the total resistance in this bridge branch to be reduced so that balancing is effected by the resistance 19 together with the ratio of gear 10 continuously changing from 1:0.25 to 1:1 in accordance with the value of resistance 28. When changing to position $e_1$ the regulator resistance corresponds to that at position $a_2$ and the ratio is 1:0.25. When changing from $e_1$ to $e_2$ the ratio of gear 10 is then infinitely varied from 1:0.25 to 1:1.15 since there is no series-connected resistance 17 here.

When the regulator arm 16 is returned to its initial position $a_1$ from its extreme position $e_2$, the above settings are achieved in inverse order.

Simultaneously with the setting of the regulator 14a, 5 controls the regulator switches 14b and 14c for the relay and control contactor assembly 13 each of which consists of a segment switch 29a and a switch whose contact segments approximately correspond to the resistance sectors A, B, C, D, E of the regulator 14a. A regulator 14b through lines 37 and 38 actuates a relay switch 33, in other words it controls the direction of rotation of the motor 11, whereas a switch 14c through lines 35 and 36 actuates the relay switch 32. In other words depending on the position of this switch, either the coil 30 or the coil 31 is energized and thus one of the two speeds $n_1$ or $n_2$ is made effective. When the arm 16 moves from $a_1$ to $b_1$ of the regulator 14a, the switch arm 16c leaves the switch segment 51 which through line 35 and relay switch 32 maintains the coil 31 of the motor 11 energized. The arm 16c then moves to the switch segment 52 which through the same relay energizes the coil 30 of the motor which latter thus rotates at its second speed. Where the regulator 16 moves from $d_2$ of the resistance section to $e_1$ of the resistance section, the arm 16c leaves the switch segment 52 and arrives on the segment 53 which is electrically connected with the segment 51 so that the coil 31 is again energized.

While the arm 16 moves over from $b_2$ of the resistance section B to $d_1$ of the resistance section D, the switch arm 16b leaves the segment 54 and after passing over a contact $c$ (to be discussed later) reaches the segment 55 whereby through lines 37 and 38 the relay switch 33 is actuated and the direction of rotation of the motor 11 is reversed.

The above mentioned arrangement makes it possible that in the control positions $a_1 \ldots a_2$ and $e_1 \ldots e_2$ the coil set 31 of motor 11 is in operation, whereas in the regulator positions $b_1 \ldots b_2$ and $d_1 \ldots d_2$ the second coil set of motor 11 is energized. In the first instance (the coil set 31 being energized) a speed of $n_1 = 1000$ R. P. M. will be obtained, whereas in the second instance a speed $n_2 = 250$ R. P. M. of the driving motor will be obtained.

As will be evident from Figs. 1 and 4, the remote control unit 3 comprises a further lever 4 by means of which the motor to be driven may selectively in each direction of rotation be connected to the network and the converter group. To this end, the lever 4 has connected thereto two switch levels 50a and 50b. The switch 50a through lines 45 and 46 actuates the switches 66a and the segments 62, 63, 64 and 65 of the relay switch 43 which latter drives the voltage to be conveyed to the consumer selectively from the network 34 or the coil 41 of the converter 9. The arrangement is such that the electric energy to be supplied to the consumer is derived from the network 34 in the positions N of the lever 4 through the intervention of the segments 62 and 65 respectively, the conductor 46 and the relay switch 43. If, however, the lever 4 is in the positions "I," the consumer 1 is connected with the converter 9 through the arm 66a, the segments 65 and 64 respectively, the conductor 46, and the relay switch 43.

The second switch level 50b the arm 66b of which is likewise actuated by the lever 4 determines the direction of rotation of the motor 1. In this way one coil of the relay switch 44 will receive voltage through the segments 56 and 57 and the lines 47 and 48, said voltage, as will be evident from Fig. 3 effecting a phase change.

If the handle 5 occupies the position "100%," the frequency furnished by the converter 9 through the coil 41 will be identical with the frequency of the network. In this position of the lever 5, as stated above, the consumer will be directly connected with the network 34. To this end, the switch 14b in the position "100%" of the lever 5 will have a contact $c$ which through line 46 will be connected with a coil of the relay switch 43 whereby the consumer is connected with the network. Since, however, the switch 50a energizes the other coil of the relay switch, a switch 60 is provided in line 45 which switch will brake this circuit when the arm 16b reaches the contact $c$. The switch arm 16b is accordingly mechanically coupled to the switch 60 as indicated by a dash line 61 in Fig. 3. However, there exists the possibility to replace the switch 60 by an additional contact level which latter will likewise be actuated by the lever 5 and will interrupt the line 45 when the switch arm 16b engages the contact $c$.

As will be evident from Fig. 3, all switch arms 16, 16b, 16c, 66a and 66b are by means of the line 67 connected with a phase of the network 34 for completing the various circuits.

Fig. 4 shows a diagrammatic view of an embodiment of the front plate of the remote control unit 3 according to Figs. 1 and 3. The control 5 of the regulator 14 can be moved across a dial which may have an "out" position and an "in" position as well as a continuous scale division from 20 to 200 calibrated in percent of the normal speed of rotation. The normal speed 100% corresponds to point C, as mentioned above, whereas position 20% corresponds to point $a_1$ and 200% to $e_2$ of the speed graph according to Fig. 2. The regulator 14 is designed to cause the points $a_2$, $b_1$ and $d_2$, $e_1$ practically to coincide on the scale The lever 4 of the remote control unit 3 is provided with an "I" and "N" position on either side of the "out" position "O," as seen in Fig. 4 and as was explained in connection with Fig. 3. In the positions "I" the principal motor 1 (Fig. 1) is supplied by the frequency converter 9 and in the positions "N" direct by the mains. The principal motor 1 rotates in one direction on the left of position "O," and in the opposite direction on the right, controlled by appropriate actuation of change-over contactors in the relay unit 13 (Figs. 1 and 3). The circuit is designed so that the converter group 7 (Fig. 1) is started without load by the lever 5 in the "N" positions of the switch 4, and can be adjusted to a desired frequency in accordance with the scale division. When the lever 4 passes from its "N" position to the adjacent "I" position, the principal motor 1 operates in the same direction as previously at the speed selected at control 5.

In a preferred embodiment of the above speed regulator the units combined in the converter group 7 (Fig. 1), i. e. frequency converter 9, infinitely variable gear 10, asynchronous motor 11, adjustable motor 12 and relay unit 13 also constitute a physical unit as shown in Fig. 5. This group 7 can be placed in any location and is connected with the remote-control unit 3 via connection 6. According to the output of the frequency converter one or more principal motors are connected to the remote control unit 3, e. g. via the connections 2a and 2b respectively the principal motors 1a and 1b supplied in parallel by the frequency converter and the mains respectively. In the converter group 7 the shaft of the driving motor carries a ventilator rotor which draws air across the motor into the common housing, whence it is expelled across the frequency converter for cooling. At least one iron-core choke coil 7a, which is almost saturated at normal loads, is provided within the common housing of the converter group 7 in the output circuit of the frequency converter supplying the motor to be driven. The impedance of the chokes varying with increasing loads ensures a certain stabilization of the frequency variable voltage supplied by the converter when load fluctuations occur.

What I claim is:

1. In a speed regulator for monophase and polyphase motors comprising an asynchronous frequency converter having an armature and being arranged for feeding the motor to be controlled, a pole changing asynchronous motor having pole changing switch means associated therewith and being arranged for driving said asynchronous frequency converter, an infinitely variable transmission interposed between and drivingly connected with said armature and said pole-changing asynchronous motor whereby the latter may drive said armature at variable speed in either direction, an electric remote control unit including manually operable control means and being electrically connected to the motor to be controlled and also being arranged for connection with a current supply source, electrically operable adjuster means interposed between and operatively connected to said control unit and said transmission for adjusting the transmission ratio of the latter in conformity with the setting of said manually operable control means, said manually operable control means being operatively connected to said pole changing switch means for actuating the latter thereby making possible continuous adjustment at least in fractional ranges of the frequency of the supply voltage for the motor to be controlled from a minimum value corresponding to a desired transmission ratio of said transmission and highest converter speed in one direction to a maximum value corresponding to a desired transmission ratio of said transmission and the highest converter speed in the opposite direction.

2. In a speed regulator for monophase and polyphase motors comprising an asynchronous frequency converter having an armature and being arranged for feeding the motor to be controlled, a pole changing asynchronous motor having pole changing switch means associated therewith and being arranged for driving said asynchronous frequency converter, an infinitely variable transmission interposed between and drivingly connected with said armature and said pole changing asynchronous motor whereby the latter may drive said armature at variable speed in either direction, an electric remote control unit including manually operable control means and being electrically connected to the motor to be controlled and also being arranged for connection with a current supply source, an electrically operable reversable adjuster motor interposed between and operatively connected to said control unit and said transmission for adjusting the transmission ratio of the latter in conformity with the setting of said manually operable control means, said manually operable control means being operatively connected to said pole changing switch means, said adjuster motor having a first coil and a second coil and a third coil, a differential relay having coil means and a relay blade electrically connected to the third coil of said adjuster motor, a bridge circuit including a regulator resistance and a variable resistance and also including said coil means, a first contact connected to said first coil, and a second contact connected to said second coil, said relay blade being movable selectively from a neutral position into engagement with said first or said second contact for causing said adjuster motor to rotate in one or the opposite direction.

3. In a speed regulator for monophase and polyphase motors comprising an asynchronous frequency converter having an armature and being arranged for feeding the motor to be controlled, a pole changing asynchronous motor having pole changing switch means associated therewith and being arranged for driving said asynchronous frequency converter, an infinitely variable transmission interposed between and drivingly connected with said armature and said pole changing asynchronous motor whereby the latter may drive said armature at variable speed in either direction, an electric remote control unit including manually operable control means and being electrically connected to the motor to be controlled and also being arranged for connection with a current supply source, an electrically operable reversable adjuster motor interposed between and operatively connected to said control unit and said transmission for adjusting the transmission ratio of the latter in conformity with the setting of said manually operable control means, said adjuster motor having a first and a second and a third motor coil, a differential relay having a first relay coil and a second relay coil and also having a relay blade electrically connected to said third motor coil, a bridge circuit including a regulator resistance and a variable resistance and also including said first and second relay coils, said first relay coil being in series with said regulator resistance and forming one branch of said bridge circuit, and said second relay coil being in series with said variable resistance and forming the other branch of said bridge circuit, a voltage source connected to the connecting points of said two branches, a first contact connected to said first motor coil, and a second contact connected to said second motor coil, said relay blade being movable from a neutral position selectively into engagement with said first or said second contact for causing said adjuster motor to rotate in one or the opposite direction.

4. In a speed regulator for monophase and polyphase motors comprising an asynchronous frequency converter having an armature and being arranged for feeding the motor to be controlled, a pole changing asynchronous motor having pole changing switch means associated therewith and being arranged for driving said asynchronous frequency converter, an infinitely variable transmission interposed between and drivingly connected to said armature and said pole changing asynchronous motor whereby the latter may drive said armature at variable speed in either direction, an electric remote control unit including manually operable control means and being electrically connected to the motor to be controlled and also being arranged for connection with a current supply source, an electrically operable reversable adjuster motor interposed between and operatively connected to said control unit and said transmission for adjusting the transmission ratio of the latter in conformity with the setting of said manually operable control means, said adjuster motor having a first and a second and a third motor coil, a polarized differential relay having coil means and also having a relay blade electrically connected to said third motor coil, a bridge circuit including a regulator resistance and a variable resistance with sliding contacts and also including said relay coil means, said relay coil means interconnecting the sliding contacts of said regulator resistance and said variable resistance, said two resistances being arranged in parallel and respectively forming the two branches of said bridge circuit, a direct current voltage source connected to the connecting points of said two branches, a first contact connected to said first motor coil, and a second contact connected to said second motor coil, said relay blade being movable from a neutral position selectively into engagement with said first or said second contact for causing said adjuster motor to rotate in one or the opposite direction.

5. In a speed regulator for monophase and polyphase motors comprising an asynchronous frequency converter having an armature and being arranged for feeding the motor to be controlled, a pole changing asynchronous motor having pole changing switch means associated therewith and being arranged for driving said asynchronous frequency converter, an infinitely variable transmission interposed between and drivingly connected with said armature and said pole changing asynchronous motor whereby the latter may drive said armature at variable speed in either direction, said variable speed transmission being equipped with an adjusting shaft, an electric remote control unit including manually operable control means and being electrically connected to the motor to be controlled and also being arranged for connection with a current supply source, an electrically operable reversable adjuster motor interposed between and operatively connected to said control unit and said transmission for adjusting the transmission ratio of the latter in conformity with the setting of said manually operable control means, said manually operable control means being operatively connected to said pole changing switch means, said adjuster motor having a first coil and a second coil and a third coil, a differential relay having coil means and a relay blade electrically connected to the third coil of said adjuster motor, a bridge circuit including a regulator resistance and a variable resistance and also including said coil means, said variable resistance including a sliding contact mechanically coupled to said adjusting shaft to vary its resistance in conformity with the adjustment of said adjusting shaft in an approximately continuous manner from a minimum to a maximum value, a first contact connected to said first coil, and a second contact connected to said second coil, said relay blade being movable selectively from a neutral position into engagement with said first or said second contact for causing said adjuster motor to rotate in one or the opposite direction.

6. An arrangement according to claim 5, which includes at least one balancing resistance arranged in series with said variable resistance for balancing the range of variation thereof.

7. In a speed regulator for monophase and polyphase motors comprising an asynchronous frequency converter having an armature and being arranged for feeding the motor to be controlled, a pole changing asynchronous motor having pole changing switch means associated therewith and being arranged for driving said asynchronous frequency converter, an infinitely variable transmission interposed between and drivingly connected with said armature and said pole changing asynchronous motor whereby the latter may drive said armature at variable speed in either direction, an electric remote control unit including manually operable control means and being electrically connected to the motor to be controlled and also being arranged for connection with a current supply source, an electrically operable reversable adjuster motor interposed between and operatively connected to said control unit and said transmission for adjusting the transmission ratio of the latter in conformity with the setting of said manually operable control means, said manually operable control means being operatively connected to said pole changing switch means, said adjuster motor having a first coil and a second coil and a third coil, a differential relay having coil means and a relay blade electrically connected to the third coil of said adjuster motor, a bridge circuit including a potentiometer having four separate resistance sectors arranged along its periphery and including a rotatable arm connected to said manually operable control means, the resistance value of said individual resistance sectors being dependent on the angular position of said rotatable arm, said bridge circuit also including a variable resistance and said coil means, a first contact connected to said first coil, and a second contact connected to said second coil, said relay blade being movable selectively from a neutral position into engagement with said first or said second contact for causing said adjuster motor to rotate in one or the opposite direction.

8. An arrangement according to claim 7, which includes a plurality of adjustable balancing resistances, each of said resistance sectors having at least one of said adjustable balancing resistances arranged in series therewith.

9. An arrangement according to claim 2, in which the regulator resistance has four resistance sections and one contact between two sections.

10. An arrangement according to claim 2, in which the pole changing asynchronous motor is designed with two different pairs of poles and two speeds.

11. An arrangement according to claim 7, which includes circuit means adapted in response to a certain position of said rotatable arm to interrupt the electric connection between said frequency converter and the motor to be controlled and to establish electric connection between the motor to be controlled and a network.

12. An arrangement according to claim 2, which includes switch means movable selectively into an "off" position in which the motor to be controlled is switched off, said switch means also being movable selectively into two further positions toward the left and toward the right of said "off" position, the arrangement being such that the two positions adjacent to and on opposite sides of said "off" position establish communication between current feeding lines and said frequency converter while the direction of rotation of the motor to be controlled in one of said last mentioned positions is opposite to the direction of rotation of said last mentioned motor in the other one of said last mentioned two positions, whereas when said switch means occupies either one of the two outermost positions the motor to be controlled is switched off from said frequency converter for the direction of rotation determined by the respective adjacent switch means position.

13. An arrangement according to claim 10, in which the rated speeds of the pole changing asynchronous motor are 1000 R. P. M. and 250 R. P. M., while the transmission ratios of the transmission from the input to the output shaft are 1:1.2; 1:0.25; 1:1; 1:0.25; and 1:1.5 respectively.

References Cited in the file of this patent

FOREIGN PATENTS 209,779    Great Britain _____ Jan. 15, 1924